United States Patent [19]

Smith

[11] Patent Number: 4,509,285

[45] Date of Patent: Apr. 9, 1985

[54] AQUACULTURE HARVESTER

[76] Inventor: C. Bruce Smith, P.O. Box 168, Kahuku, Hi. 96731

[21] Appl. No.: 384,280

[22] Filed: Jun. 2, 1982

[51] Int. Cl.³ ............................................. A01K 73/00
[52] U.S. Cl. ......................................... 43/9; 43/17.1; 119/3
[58] Field of Search ...................... 43/7, 8, 9, 14, 17.1, 43/4, 4.5, 104; 37/119; 119/3, 5

[56] References Cited

U.S. PATENT DOCUMENTS

| | | | |
|---|---|---|---|
| 734,571 | 7/1903 | Knapp | 37/119 |
| 1,252,500 | 1/1918 | Schnoor | 37/119 |
| 2,560,622 | 7/1951 | Abramowski | 43/9 |
| 3,491,474 | 1/1970 | Metcalf | 43/9 |
| 3,553,879 | 1/1971 | Ellis | 119/3 |
| 3,651,595 | 3/1972 | Newman | 43/9 |
| 3,715,831 | 2/1973 | Mason | 43/4.5 |
| 3,777,388 | 12/1973 | Newman | 43/17.1 |
| 4,276,710 | 7/1981 | Yunker | 43/4 |
| 4,299,047 | 11/1981 | Collins | 43/9 |

*Primary Examiner*—Gene P. Crosby
*Attorney, Agent, or Firm*—Cushman, Darby & Cushman

[57] ABSTRACT

To harvest aquaculture from a pond, a net called a floor is placed at the bottom of one end of the pond. A second net, called a wing, is pulled with tractors from the opposite end of the pond to concentrate aquaculture on the floor. The wing is attached to wheel assemblies, which, in turn, are attached to booms pivotably connected to the tractors. As the wing sweeps down the pond, wheels in the wheel assemblies seal the edges of the pond. Floats and weights ensure that the wing covers the entire vertical cross-section of the pond. Conductors are employed at the base of the wing to create a current which causes aquaculture to leave the bottom. Hydraulic means are employed to adjust the height of the booms so that the wheels follow the land contours near the edges of the pond and so that the booms may lift the floor to concentrate the aquaculture therein.

28 Claims, 8 Drawing Figures

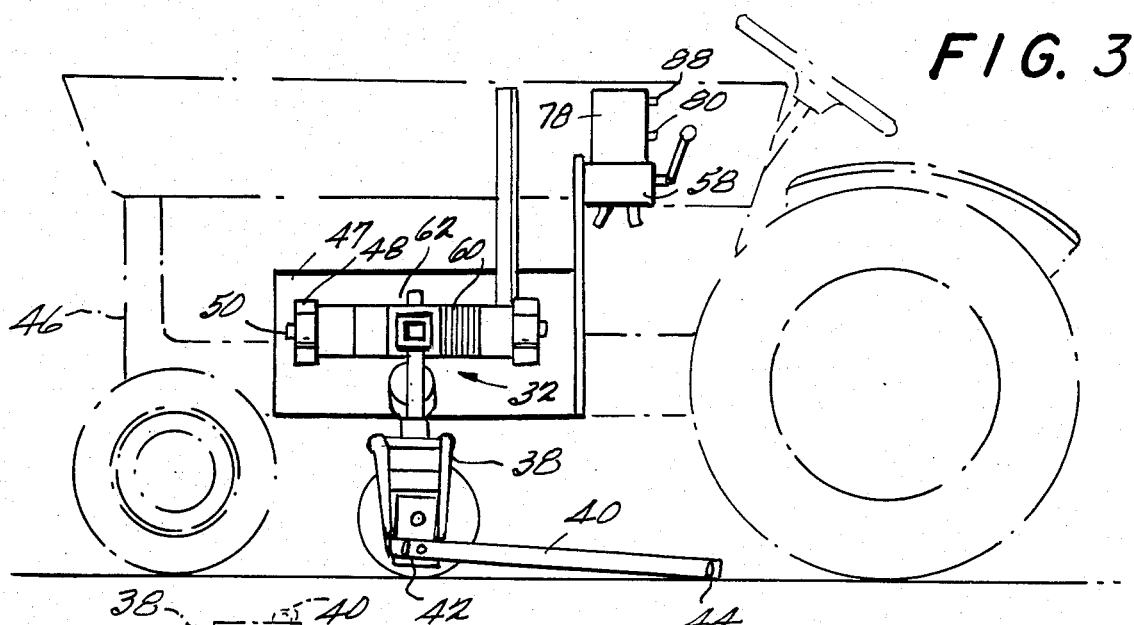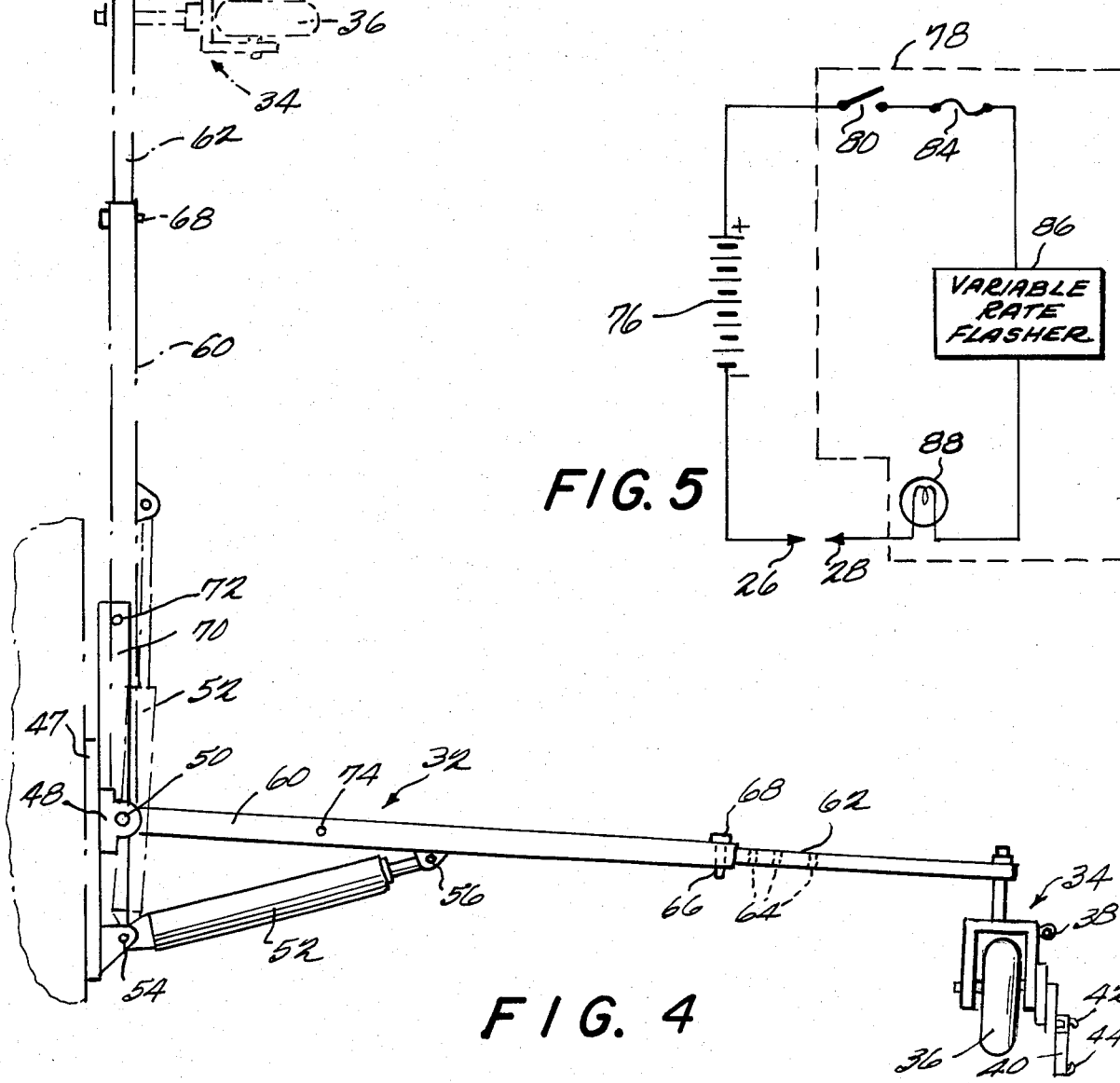

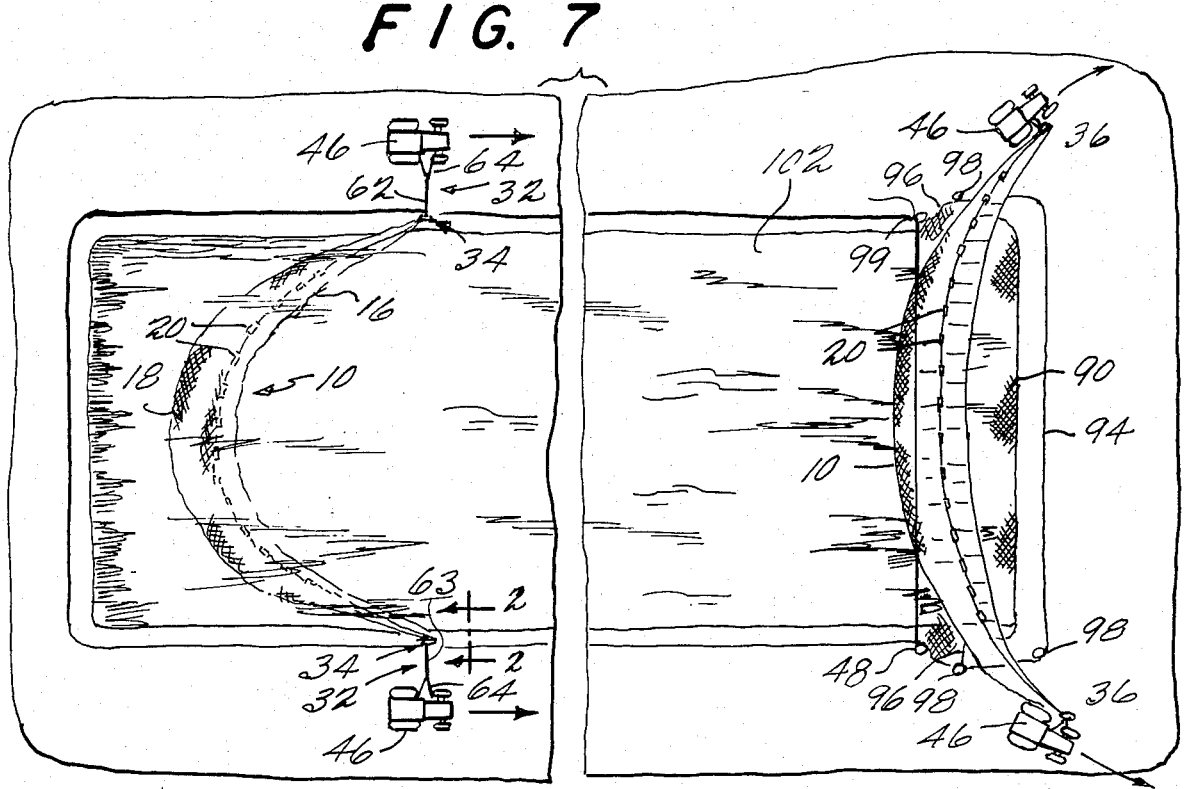
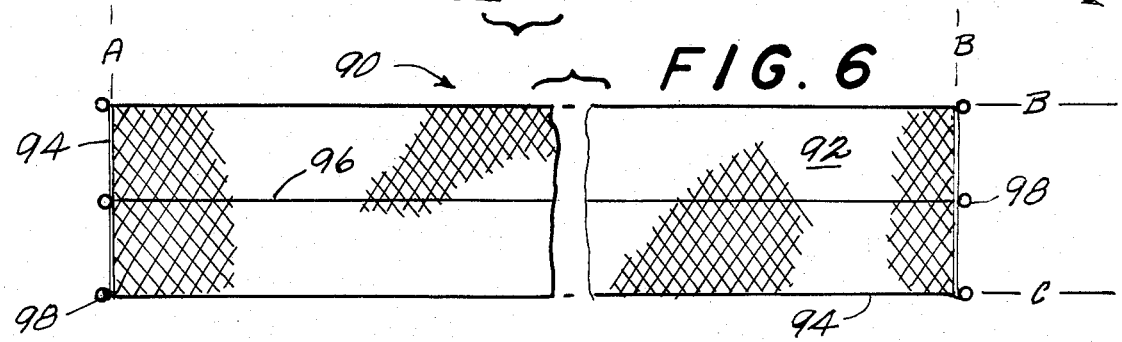
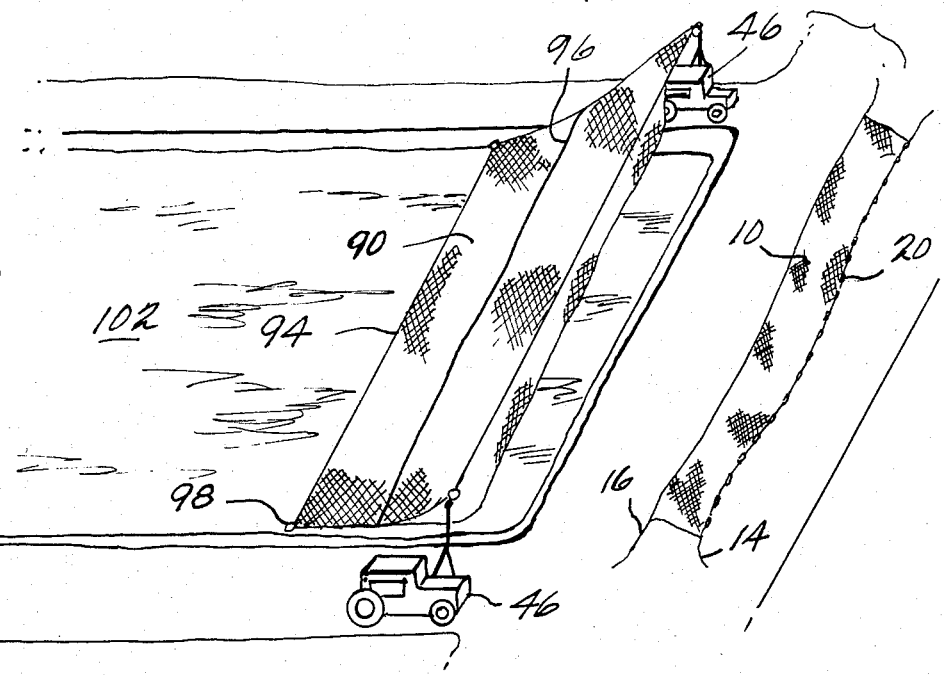

AQUACULTURE HARVESTER

BACKGROUND OF THE INVENTION

1. Field of the Invention

This invention relates to a method and apparatus for harvesting aquaculture. More specifically, the present invention relates to the use of nets and hydraulic machinery to harvest aquaculture from a relatively confined body of water such as a pond.

2. Description of the Prior Art

While serving as a source of food, the rivers, lakes and seas have present the problem of catching fish and other life in the underwater environment for which mankind is not particularly well adapted. Tools were developed very early to assist in retrieving food from the waters. As the centuries have passed, the tools have grown both in complexity and effectiveness. Some of the more recently developed tools are illustrated in the following United States Patents:

U.S. Pat. No. 734,571—Knapp
U.S. Pat. No. 1,304,302—Gage, Sr.
U.S. Pat. No. 3,113,389—Vuskovich
U.S. Pat. No. 3,458,947—Ross
U.S. Pat. No. 3,608,217—Voisin, Sr.
U.S. Pat. No. 3,777,388—Newman et al The patents listed above all relate to devices for catching fish or the like in bodies of water too large to harvest completely. However, it has been realized that certain species of aquaculture can be raised in relatively small, confined bodies of water. Raising aquaculture in either natural or manmade confined bodies of water greatly simplifies and makes more efficient the task of harvesting the aquaculture. Just as mankind progressed from hunting to farming to help create a steady supply of food on land, aquaculture is now being raised to increase and improve the supply of seafood.

To harvest a relatively small pond, a manual technique has been commonly employed in which three or four men move a net called a wing down the length of a pond. This operation alone takes 30 to 45 minutes with a 100×500 foot pond. When the wing is about 100 feet from the end of the pond, the harvesting crew attaches a second net called a bag to the end of the wing. The bag is a net sewn into the shape of a topless shoebox with one end open. The crew then continues to move the end of the wing opposite the bag around the end of the pond and back towards the bag. Thus, the area in which the aquaculture are surrounded becomes smaller. As harvesting proceeds, the crew must work more and more slowly to avoid allowing the aquaculture which become increasingly dense to escape from under the wing. Eventually, the aquaculture are concentrated in the bag.

The total operation for harvesting a 100×500 foot pond takes three to four men 1.5 to 2 hours. Even at this slow speed, only 40 to 70 percent of the aquaculture within the pond are captured.

To improve on this manual technique, several mechanical devices have been developed to harvest aquaculture from a confined body of water. The following United States patents all teach devices to improve the harvesting of aquaculture from confined bodies of water:

U.S. Pat. No. 1,252,500—Schnoor
U.S. Pat. No. 3,473,509—Miyamura
U.S. Pat. No. 3,553,879—Ellis
U.S. Pat. No. 3,715,831—Mason
U.S. Pat. No. 4,276,710—Yunker et al Ellis, supra, discloses a seine tow bar used for drawing a net behind a pair of tractors for harvesting fish in a farm fishpond. Each tow bar has a tractor mounting hitch and a pivot arm to which a seine is attached. Attached to the opposite end of the pivot arm is a skid which rides along the bottom of the pond. As the seine is drawn through the pond, the arm pivots to follow the contour of the pond bottom so that the seine is maintained close to the bottom and the escape of fish past the seine is supposedly prevented. After the tractors proceed down the pond, the tractors then approach each other and the net is drawn in to concentrate the fish in a small area.

Yunker et al, supra, teaches drawing a single net across a rectangular pond. The net is carried by a device having a truss which is maintained above the pond by a carriage on each side. This patent teaches the use of an inclined ramp at the end of the pond to facilitate removal of the aquaculture from the pond.

These patents teach systems which are suspect with respect to efficiency due to both the possibility of aquaculture escape around the edge of the net, and also the difficulty of removing aquaculture from the pond. In Ellis, the patent drawing shows a gap between the bottom of the pond and the boom to which the net is attached. Furthermore, in Ellis, no easy method is taught for actually removing the aquaculture from the pond. The device in Yunker et al is fairly rigid. If the contours of the pond change as is typically caused by erosion or the like, gaps are created between the net and the pond. Furthermore, the ramp provided at the end of the pond requires careful construction to prevent unevenness which would cause gaps to form under the net through which aquaculture can escape.

The loss of harvesting efficiency caused by aquaculture escaping under nets has been recognized as a problem to at least a certain extent. Thus, the following United States patents all teach the use of electrodes to prevent aquaculture from escaping beneath trawling nets:

U.S. Pat. No. 3,491,474—Metalf, Jr.
U.S. Pat. No. 3,415,001—Ott et al
U.S. Pat. No. 3,651,595—Newman
U.S. Pat. No. 3,775,891—Holt However, none of these patents teach an electrification system suitable for use in conjunction with a net for sweeping the entire volume of a relatively small pond.

SUMMARY OF THE INVENTION

The present invention provides an easy and inexpensive method and apparatus for harvesting aquaculture from a relatively small pond. Furthermore, the present invention maximizes the efficiency of aquaculture harvesting by maximizing the percentage of aquaculture captured and minimizing the time and number of men required.

In the present invention, a net, referred to as a wing, is extended across the pond in which the aquaculture reside. The wing has a length at least as long as the width of the pond and a height at least as great as the depth of the pond. Floats are provided along the top end of the wing to prevent aquaculture from escaping over the top of the wing. Weights are provided at the bottom of the wing to guarantee that the wing follows the bottom contours of the pond. Furthermore, conductors are provided at the bottom of the wing for creating an electrical current to encourage aquaculture to move away from the bottom of the pond.

Each end of the wing is attached to a rolling wheel assembly which is, in turn, attached to a hydraulically operated boom connected to a tractor. The wheel assembly includes a bracket to which the ends of the wing are attached. The tractors are driven down the length of the pond so that the wheel follows the very edge of the pond preventing aquaculture from escaping around the end of the wing.

Prior to driving the wing down the length of the pond, a second net, called a floor, is placed on the bottom of the pond at the opposite end. The floor is at least as long as the pond is wide and wide enough to extend a reasonable working distance into the pond. The tractors draw the wing down the pond until the wing is entirely over the floor. Then, the floor may be lifted to totally entrap and further concentrate the aquaculture thereupon.

In the preferred embodiment, the angular orientation of the boom with respect to the tractor can be adjusted hydraulically so that the wheel can be positioned to follow what may be irregular land contours at the edge of the pond. At the end of a sweep, the booms may be disconnected from the wing and connected to the corners of the floor. Then, the hydraulics associated with the booms can be employed to lift the floor to further concentrate the entrapped aquaculture and facilitate their removal from the pond.

With the present invention, two or three men can harvest 90 to 100 percent the aquaculture in a 100×500 foot pond in from 20 to 30 minutes, a substantial improvement both with respect to the number of men, length of time and percentage of harvest over the manual method described above.

BRIEF DESCRIPTION OF THE DRAWINGS

These and other objects and advantages of the invention will become more apparent and more readily appreciated from the following detailed description of the presently preferred exemplary embodiment of the invention taken in conjunction with the accompanying drawings, of which:

FIG. 3 is an elevational view showing the connection of the boom of the present invention to a tractor;

FIG. 4 is a side elevational view of the present invention showing the boom in both the upright and working positions;

FIG. 5 is a circuit diagram of the present invention;

FIG. 6 is a top plan view of the floor of the present invention;

FIG. 7 is a plan view showing the wing of the present invention being drawn along the length of the pond; and FIG. 8 is a plan view showing the floor of the present invention being taken up.

DETAILED DESCRIPTION OF THE PRESENTLY PREFERRED EXEMPLARY EMBODIMENT

Figure 2:
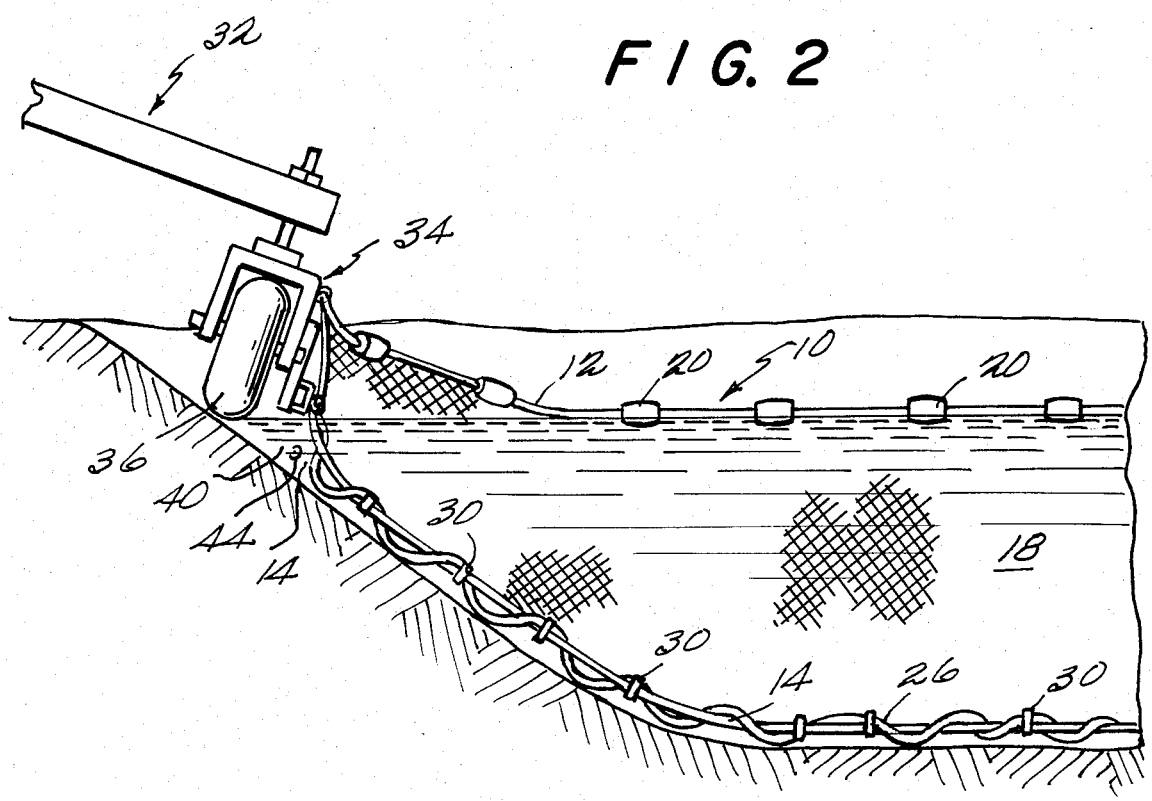
FIG. 2 is a fragmentary elevational view showing the connection of the wing to the wheel assembly and boom of the present invention.
Figure 1:
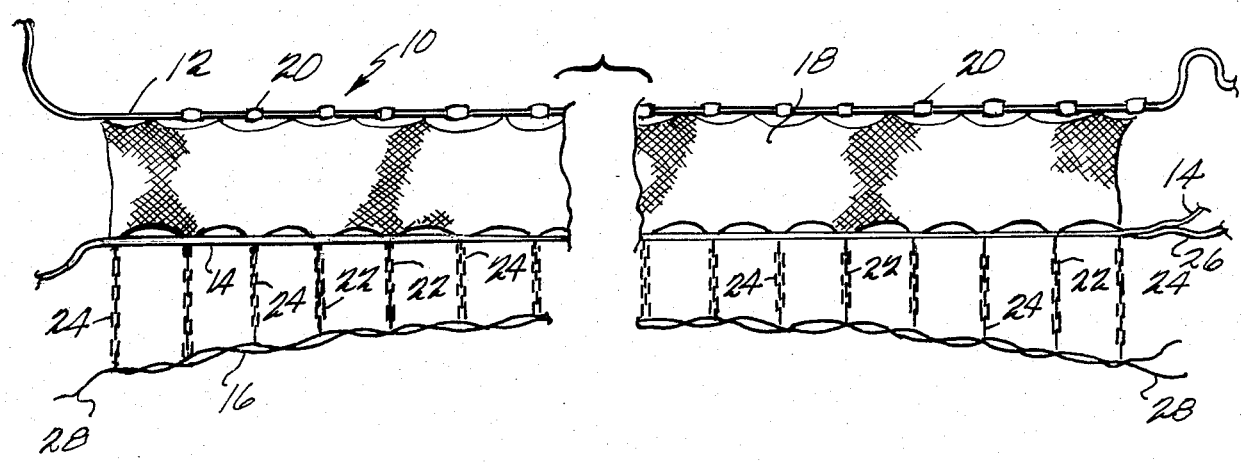
FIG. 1 is a front elevational view of the wing of the present invention.

The preferred embodiment of the present invention is particularly well suited for harvesting prawns and shrimp although it may be employed for harvesting fish and other free swimming aquaculture generally. As best illustrated in FIGS. 1 and 2, wing 10 includes a head rope 12, a foot rope 14 and a tow rope 16. Each of these ropes is long enough to extend across the width of the pond in which the aquaculture are disposed, and may, in fact, be in the form of a cable. Attached between head rope 12 and foot rope 14 is a water permeable, aquaculture impermeable web 18, which, in the preferred embodiment, is a net having a mesh sufficiently spaced to retain the aquaculture being harvested and let pass the smaller aquaculture not yet ready for harvest. Disposed along head rope 12 are a plurality of floats 20. Floats 20 maintain the top edge of wing 10 at the surface of the water to prevent aquaculture from escaping over the top of the net.

Foot rope 14 is connected to tow rope 16 by means of stringers 22. To insure that foot rope 14 follows the contours of the bottom of the pond, weights 24 are disposed along each of stringers 22. Weights 24 should not cause foot rope 14 to dig into silt and detritus on the bottom of the bond. Similarly, foot rope 14 should have a relatively large diameter (e.g., 1 or more inches) to further insure a gliding rather than dozing action. As is illustrated in FIG. 1, stringers 22 are of uniform length in the middle half of wing 10. At the end quarters of wing 10 stringers 22 become gradually longer. This gradual lengthening near the ends of wing 10 aids in distributing the pulling forces on tow rope 16 evenly across the entire net.

That is, if web 18 was pulled at the bottom by foot rope 14 alone, wing 10 would tend to lift up at the point where the sloping side embankment meets the flat bottom of the pond and wherever it encountered mud, rocks, or other force-concentrating impediments in the pond. By employing tow rope 16, foot rope 14 and stringers 22, the point forces or area forces exerted on tow rope 16 are distributed evenly along the length of foot rope 14, enabling it to follow the contours of the pond bottom more closely. In order to further minimize the net lifting effects of tension, the length of wing 10, in the preferred embodiment, is approximately 1½ times the width of the pond creating a gentle parabolic shape to wing 10 as it moves through the pond.

Entwined with foot rope 14 and tow rope 16 are electrically conductive cables 26 and 28, respectively. In the preferred embodiment, cables 26 and 28 are a quarter inch galvanized steel cables. Cables 26 and 28 may be interconnected with foot rope 14 and tow rope 16, respectively, by means of ties 30 or other convenient means. Cables 26 and 28 are employed to create a pulsating electrical current near the base of wing 10. This causes aquaculture near or just below the bottom of the pond to rise up off of the bottom of the pond to avoid the electrical current. For this reason, in the preferred embodiment, the height of the web 18 is at least twice the depth of the pond to create a pocket near the center of web 18 into which most of the aquaculture collect, away from the damaging effects of continual exposure to the pulsating electrical current. Thus, in the preferred embodiment, the pond is three to four feet deep and web 18 has a height of eight feet.

FIG. 2 illustrates the connection of wing 10 to boom 32. The connection of only a single end of wing 10 to a single boom 32 is illustrated in detail since the connection of the other end of wing 10 to another boom 32 is identical. Boom 32 includes a wheel assembly 34 to which free spinning wheel 36 is attached. Wheel assembly 34 includes an eye ring 38 to which head rope 12 is attached. As best illustrated in FIGS. 2 and 3, pivotably connected to wheel assembly 34 is stretcher bar 40. Stretcher bar 40 has eye rings 42 and 44 on opposite ends thereof. The distance between eye rings 42 and 44 is equal to the length of the longest stringer at the very end of wing 10. Tow rope 16 is attached to eye ring 42 and foot rope 14 is attached to eye ring 44.

As illustrated in FIGS. 3 and 4, boom 32 is pivotably attached to tractor 46. Specifically, bracket 47 is rigidly attached to tractor 46 and pivotably attached to boom 32 by means of bearings 48 and pin 50. The angular orientation of boom 32 with respect to tractor 46 is controlled by hydraulic cylinder and piston 52 which is pivotably connected to both bracket 47 and boom 32 by pins 54 and 56, respectively. Hydraulic piston 52 is controlled by valve assembly 58 (see FIG. 3) in a manner that is entirely conventional for farm tractors.

Boom 32 includes a fixed portion 60 through which pin 50 passes and an adjustable portion 62 which is slidably engaged with portion 60. Wheel assembly 34 is attached to adjustable portion 62. Adjustable portion 62 has a plurality of holes 64 passing therethrough. Any hole 64 can be aligned with a hole 66 in portion 60. Pin 68 may then be inserted through hole 66 and the aligned hole 64 to fix the position of adjustable boom portion 62 with fixed boom portion 60. For storage, and in some modes of operation as will be described below, it is desirable that boom 32 be maintained vertically. Accordingly, hydraulic piston 52 may be energized to raise boom 32. Support 70 is rigidly attached to bracket 47. Support 70 includes a hole 72 which aligns with hole 74 in boom 32 when boom 32 is in a vertical position. A pin may then be placed through holes 72 and 74 to lock the position of boom 32.

FIG. 5 is a circuit diagram of the present invention. Electrical conductors 26 and 28 are represented as electrodes in FIG. 5. Insulated wires running along boom 32 connect electrical conductors 26 and 28 to the remainder of the circuit. Thus, electrical conductor 26 is connected to one terminal of battery 76. The other terminal of battery 76 is connected to an on-off switch 80 which is connected through a fuse 84 to a variable rate flasher 86. The variable rate flasher 86 is connected through a lamp 88 to electrical conductor 28. In the preferred embodiment, variable rate flasher 86 is a commercially available device which intermittently passes current much like those used to control turn signal lights on automobiles. Fuse 84 prevents overload damage to variable rate flasher 86 while lamp 88 provides visual means for determining whether the pulsing circuitry is functioning properly. Thus, the circuitry in FIG. 5 causes a current to flow between conductors 26 and 28 in a pulsating fashion as controlled by variable rate flasher 86.

FIG. 6 shows the construction of floor 90 which consists of a water permeable, aquaculture impermeable web 92, of the same or different size mesh as web 18 used in wing 10, surrounded by a perimeter rope 94 and bisected along its length by a center rope 96. Eye rings 98 are attached to perimeter rope 94 at the corners of web 92 and at the ends of center rope 96 to facilitate pinning and lifting of floor 90 without damage to web 92 as will be described below. The length of rectangular floor 90 from point A to point B must be longer than the pond is wide so that eye rings 98 may be pinned to the embankments of the pond with web 92 resting on the bottom of the pond. The width of floor 90 from point B to point C must be at least 20 feet, and preferably more, so that the total entrapment function of floor 90 in conjunction with wing 10 may be truly effective.

FIGS. 7 and 8 illustrate a manner in which the present invention may be employed. Floor 90 is positioned at one end of pond 102 with the side edges and trailing length-wise edge of perimeter rope 94 pinned above water to the pond's embankment and the leading length-wise edge of the perimeter rope 91 pressed into the pond's bottom so that web 92 lies on the bottom of pond 102. Floor 90 is thus open (submerged) along one edge facing the direction of advance by wing 10 and closed (above water) on its remaining edges. Wing 10 is positioned at the other end of pond 102 between tractors 46. Booms 32 are lowered so that tires 36 are positioned at the very edge of pond 102. Tractors 46 then proceed along the edges of pond 102 toward floor 90.

As tractors 46 advance along the embankment of pond 102, the tractor operators place hydraulic control valve 58 into a float position so wheels 36 may roll up and down the bottom contours at the edge of pond 102 maintaining a seal by means of gravity. If obstructions are encountered over which wheels 36 cannot roll, control valve 58 is placed into a power position so that wheels 36 can be lifted and relowered without interruption to the continuous advance of tractors 46.

Thus, the use of a wheel at the end of a boom seals the end of wing 10 at the edge of pond 102 to prevent aquaculture from escaping therearound while providing a relatively frictionless means of advance for wing 10. The use of tow rope 16 connected to foot rope 14 by means of stringers 22 seals the bottom of wing 10 to the bottom of pond 102. Electrical conductors 26 and 28 shock any aquaculture hiding in depressions on the bottom of pond 102 so that they are captured by wing 10. Floats 20 prevent aquaculture from escaping over the top of wing 10.

Eventually, wing 10 crosses over floor 90 as illustrated on the right hand portion of FIG. 7, and approaches the end of pond 102. Because of the substantially increased density of the surrounded aquaculture, it is important, during this stage, that tractors 46 continue smoothly and without stopping. In the preferred embodiment, when wheels 36 reach the end of pond 102, the trailing part of wing 10 has not yet passed over the submerged leading edge of floor 90. Only after booms 32 have passed approximately 20 feet beyond the end of pond 102 will the center-most portion of wing 10 pass over and onto floor 90. If tractors 46 stop before this point, aquaculture will escape. The slope of the embankment at the end of pond 102 facing the advance of wheels 36 is usually too steep to roll up and over freely. Hydraulic power to boom 32 enables wheels 36 to exit pond 102 smoothly and without interruption to the final critical stages of harvest.

After the last portion of wing 10 is over floor 90, the submerged leading edge of perimeter rope 94 is lifted out of the water, stretched taut by means of a binder, come-a-long or other portable tensioning device, and pinned to the embankments on both sides of pond 102. With all four edges of perimeter rope 91 now above water, the harvestable aquaculture on top of floor 90 are totally entrapped. Wing 10 may then be removed as illustrated in FIG. 8. Then, the corners of the leading or trailing edges of floor 90 may be attached to booms 32 and booms 32 may be lifted to their vertical positions to expose center rope 96. Center rope 96 is then stretched and pinned to the embankments. Thus floor 90 is reduced to one half its original width. The reduced width can then be easily managed by two members of the crew who then work the aquaculture from one side of pond 102 to the opposite side so that the aquaculture are concentrated in a corner of pond 102 and may be removed therefrom with a fish pump, hand-held scoop nets or the like. Alternatively, floor 90 may be simply lifted from pond 102 to remove the aquaculture.

The use of hydraulic means to operate booms 32 provides a number of advantages. Thus, booms 32 may be lowered from their upright or travel position to their horizontal working position without risk of injury to the operator or damage to the equipment which might result from the heavy weight of boom 32. Also, hydraulic adjustability allows booms 32 to avoid impediments in the pond over which wheels 36 cannot pass. This is especially important at the end of the pond where the facing embankment is nearly vertical because of erosion of the earthworks at the water line. Without mechanical means, it would require at least two men to remove booms 32 from the pond at the end of the harvest run, i.e., one or more men to lift each boom 32 from the water up to road level and one man to drive the tractor 46 away from the water. Finally, hydraulic operation of boom 32 simplifies the task of raising floor 90 for the purpose of concentrating aquaculture into a smaller and more manageable area for removal to market. Due to the weight of floor 90 and the aquaculture therein, hydraulic assistance is important for this task. As indicated above, the floor extends 20 or more feet up the length of the pond. In order for two men to be able to remove aquaculture from floor 90, it is necessary to reduce this dimension by one half or so. In order to achieve this reduced width without allowing the aquaculture to escape, it is necessary to lift and hold the corners of floor 90, 10 or more feet above the water level. Only with the assistance of telescoping, hydraulically powered booms can two men perform the task of concentrating the aquaculture within a corner of pond 102.

Although only a single exemplary embodiment of this invention has been described in detail above, those skilled in the art will readily appreciate that many modifications are possible in the exemplary embodiment without materially departing from the novel teachings and advantages of this invention. Accordingly, all such modifications are intended to be included within the scope of this invention as defined by the following claims.

What is claimed is:

1. A method of harvesting aquaculture from a body of water comprising the steps of:
   disposing a first water permeable, aquaculture impermeable web on the bottom of said body;
   dragging a second water permeable, aquaculture impermeable web through said body of water toward said first web until any portion of said second web in said body of water is over said first web; and
   lifting said first web to concentrate said aquaculture thereupon.

2. A method of harvesting aquaculture from a body of water comprising the steps of:
   disposing a first water permeable, aquaculture impermeable web on the bottom of said body;
   dragging a second water permeable, aquaculture impermeable web through said body of water towards said first web until any portion of said second web in said body of water is over said first web;
   maintaining one edge of said second web at the surface of said body of water and another edge of said second web at the bottom of said body of water during said dragging step; and
   lifting said first web to concentrate said aquaculture thereupon.

3. A method as in claim 1 or 2 wherein:
   said method further includes the step of adjusting the height of opposite edges of said second web with respect to the surface of said body of water so that said opposite edges follow land contours adjacent the edges of said body of water; and
   said lifting step includes the step of hydraulically lifting said first web to concentrate said aquaculture thereupon.

4. A method as in claim 2 wherein said maintaining step comprises the steps of:
   disposing floats along the top edge of said second web; and
   disposing weights along a bottom edge of said second web.

5. A method of harvesting aquaculture from a body of water comprising the steps of:
   disposing a first water permeable, aquaculture impermeable web on the bottom of said body, said first web having a width at least as great as the width of said body;
   attaching each end of a second water permeable, aquaculture impermeable web to a wheel assembly, said second web extending to cover at least the vertical cross section across the width of said body of water;
   rolling wheels of said wheel assemblies along opposite edges of said body of water from one end of said body of water to the other;
   mechanically adjusting the height of said wheels with respect to the surface of said body of water so that said wheels follow land contours adjacent the edges of said body of water; and
   mechanically lifting said first web to concentrate said aquaculture thereupon.

6. A method as in claim 5 wherein said adjusting step and said lifting step include the steps of:
   hydraulically adjusting the height of said wheels with respect to the surface of said body of water so that said wheels follow land contours adjacent the edges of said body of water; and
   hydraulically lifting said first web to concentrate said aquaculture thereupon.

7. A method as in claim 1 or 5 further comprising the steps of:
   disposing floats along the top edge of said second web; and
   disposing weights along a bottom edge of said second web.

8. A method of harvesting aquaculture from a body of water comprising the steps of:
   disposing a first water permeable, aquaculture impermeable web on the bottom of said body, said first web having a width at least as great as the width of said body;
   dragging a second water permeable, aquaculture impermeable web through said body of water toward said first web until any portion of said second web in said body of water is over said first web, said second web extending to cover at least the vertical cross section across the width of said body of water;

creating an electric current along the entire /bottom of said second web during said dragging step; and lifting said first web to concentrate said aquaculture thereupon.

9. A method as in claim 5 wherein said rolling step includes the step of driving booms along opposite edges of said body of water, each of said wheels being rotatably attached to one of said booms, respectively.

10. A method of harvesting aquaculture from a body of water comprising the steps of:

disposing a first water permeable, aquaculture impermeable web on the bottom of said body;

attaching each end of a second water permeable, aquaculture impermeable web to a wheel assembly;

rolling wheels of said wheel assemblies along opposite edges of the length of said body of water from one end of said body of water to the other until any portion of said second web in said body has passed over said first web;

maintaining one edge of said second web along the surface of said body of water and a second edge of said second web along the bottom of said body of water;

creating an electric current along the entire bottom of said second web during said rolling step;

mechanically adjusting the height of said wheels with respect to the surface of said body of water so that said wheels follow land contours adjacent the edges of said body of water; and mechanically lifting said first web to concentrate said aquaculture thereupon.

11. A method as in claim 8 or 10 wherein said step of creating an electric current comprises the steps of:

disposing first and second electrical conductors in a spaced relationship to each other on the bottom of said second web and before said second web with respect to the direction of said dragging step; and applying a pulsating voltage across said first and second electrical conductors.

12. Apparatus for farming aquaculture from a body of water comprising:

a first water permeable, aquaculture impermeable web adapted to be disposed on a portion of the bottom of said body of water;

a second water permeable, aquaculture impermeable web; and means for motivating said second web toward said first web to concentrate said aquaculture over said first web.

13. Apparatus for farming aquaculture from a body of water comprising:

a first water permeable, aquaculture impermeable web adapted to be disposed on the bottom of said body of water and having a width at least as great as the width of said body;

first and second wheel assemblies, each including a wheel;

a second water permeable, aquaculture impermeable web having a first end attached to said first wheel assembly and a second end attached to said second wheel assembly, the length of said web being at least as great as the width of said body of water and the height of said web being at least as great as the depth of said body of water; and first and second means, each for rolling one of said first and second wheels along opposite edges of said body of water.

14. Apparatus as in claim 13 further comprising hydraulic means for adjusting the height of said web.

15. Apparatus for harvesting aquaculture from a body of water comprising:

a first water permeable, aquaculture impermeable web adapted to be disposed on the bottom of said body of water and having a width at least as great as the width of said body;

a second water permeable, aquaculture impermeable web sufficiently large to cover at least the vertical cross section across the width of said body of water;

means for moving said second web toward said first web; and mechanical means removably connectable to said first web and said second web for adjusting the height of said second web as it moves along said body of water and for lifting said first web to concentrate said aquaculture therein.

16. Apparatus as in claim 15 wherein said means for adjusting and lifting includes hydraulic means for adjusting the height of said second web and lifting said first web.

17. Apparatus as in claim 12, 13 or 15 further comprising means for maintaining a first edge of said second web at the surface of said body of water and for maintaining a second edge of said second web at the bottom of said body of water.

18. Apparatus as in claim 12, 13 or 15 further comprising:

a head rope extendable across said body of water;

a foot rope extendable across said body of water, said web being connected between said head rope and said foot rope;

a tow rope extendable across said body of water, at least said head rope and said tow rope being connected to said moving means;

a plurality of stringers interconnecting said foot rope and said tow rope; and weight means attached to said stringers.

19. Apparatus as in claim 18 wherein the length of said stringers gradually increases as the edge of said body of water is approached.

20. Apparatus for harvesting aquaculture from a body of water comprising:

a head rope extendable across said body of water;

a foot rope extendable across said body of water;

a water permeable, aquaculture impermeable web extending between said head rope and said foot rope, having a length at least as great as the width of said body of water and a height at least as great as the depth of said body of water;

a tow rope extendable across said body of water;

a plurality of stringers interconnecting said foot rope and said tow rope, the length of said stringers gradually increasing as the edge of said body of water is approached; and means, attached at least to said head rope and said tow rope, for moving said web along said body of water.

21. Apparatus for farming aquaculture from a body of water comprising:

a first water permeable, aquaculture impermeable web disposed on the bottom of said body of water;

a second water permeable, aquaculture impermeable web;

means for moving said second web along said body of water toward said first web; and means for creating an electrical current along the entire bottom of said second web.

22. Apparatus as in claim 12, 13, 15 or 21 further comprising:
   a peripheral rope extending around the periphery of said first web; and
   at least one center rope extending across the length of said first web.

23. Apparatus for harvesting aquaculture from a body of water comprising:
   first and second booms;
   first and second wheel assemblies each including a wheel, one of said wheels being rotatably attached to each of said booms, respectively;
   first and second means, each for motivating one of said booms along opposite sides of said body of water so that said wheels roll along the edges of said body of water, said booms being pivotably attached to said motivating means;
   first and second hydraulic means, each for adjusting the angular orientation of one of said booms with respect to said motivating means to adjust the height of said wheels with respect to the surface of said body of water so that said wheels follow land contours adjacent the edges of said body of water; and
   a water permeable, aquaculture impermeable web attached between said wheel assemblies, said web having a length at least as great as the width of said body of water and a height at least as great as the depth of said body of water.

24. Apparatus as in claim 12, 13, 15, or 30 further comprising means for creating an electric current at the bottom of said web.

25. Apparatus for harvesting aquaculture from a body of water comprising:
   a head rope extendable across said body of water;
   at least one float disposed along said head rope;
   a foot rope extendable across said body of water;
   a water permeable, aquaculture impermeable web extending between said head rope and said foot rope, having a length at least as great as the width of said body of water and a height greater than the depth of said body of water;
   a tow rope extendable across said body of water;
   a plurality of stringers interconnecting said foot rope and said tow rope;
   weight means attached to said stringers;
   first and second electrical conductors, each disposed along one of said foot rope and tow rope, respectively;
   means for applying a pulsating voltage across said first and second conductors; and
   first and second means, attached to said head and tow ropes, for moving said web through said body of water.

26. Apparatus as in claim 25 wherein the lengths of said stringers gradually increase as the edge of said body of water is approached.

27. Apparatus for farming aquaculture from a body of water comprising:
   a first net disposed on the bottom of said body of water, the length of said first net being at least as great as the width of said body of water;
   first and second booms;
   first and second wheel assemblies, each including a wheel, one of said wheels being rotatably attached to each of said booms, respectively;
   first and second means, each for motivating one of said booms along opposite sides of said body of water so that said wheels roll along edges of said body of water, said booms being pivotably attached to said motivating means;
   first and second hydraulic means, each for adjusting the angular orientation of one of said booms with respect to said motivating means to adjust the height of said wheels with respect to the surface of said body of water so that said wheels follow land contours adjacent to the edges of said body of water and to lift said first net to concentrate said aquaculture therein;
   first and seond means each for adjusting the length of one of said booms, respectively;
   a head rope extending between said first and second wheel assemblies;
   a plurality of floats disposed along said head rope;
   a foot rope extending between said first and second wheel assemblies;
   a second net extending between said head rope and said foot rope, having a length at least as great as the width of said body of water and a height at least as great as the depth of said body of water;
   a tow rope extending between said first and second wheel assemblies;
   a plurality of stringers interconnecting said foot rope and said tow rope, said stringers near the ends of said foot and tow ropes being longer than said stringers near the centers of said foot and tow ropes;
   weight means attached to said stringers;
   first and second electrical conductors, each disposed along one of said foot rope and tow rope, respectively; and
   means for applying a pulsating voltage across said first and second conductors.

28. Apparatus as in claim 24 wherein said creating means includes means for creating pulses of electric current.

* * * * *